Figure 1:
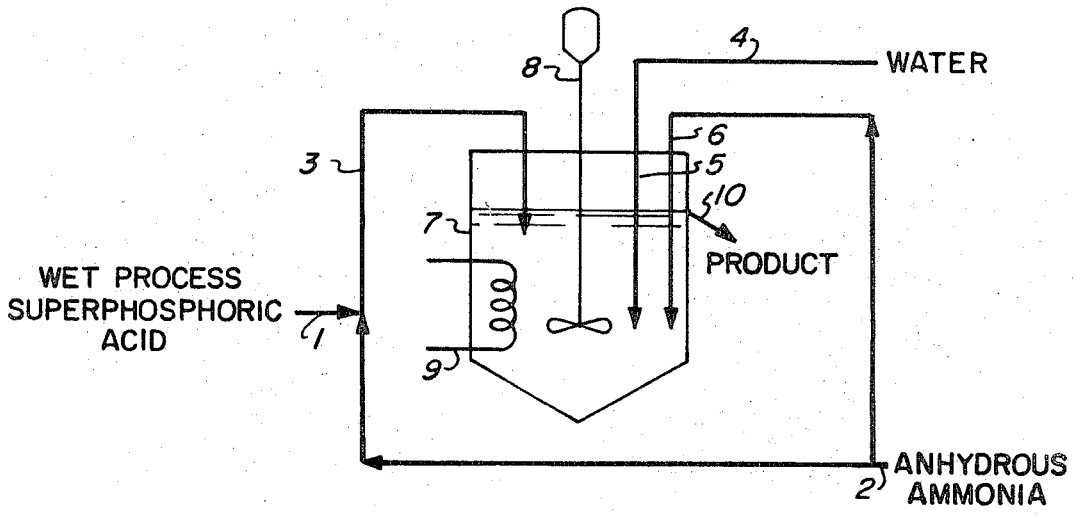
Figure 2:
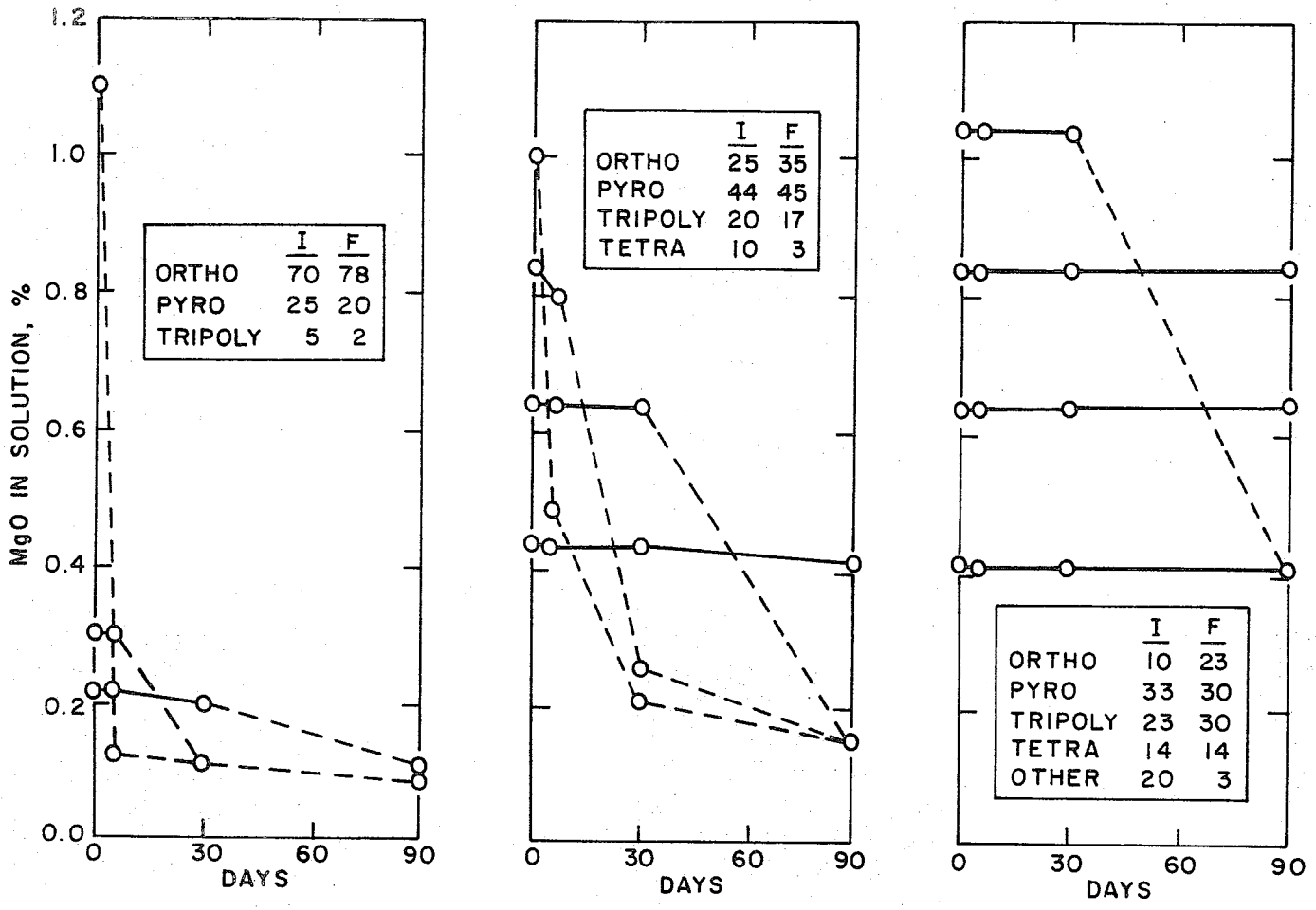

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 28, 1972

896 O.G. 1209

T896,056
AMMONIUM POLYPHOSPHATE SOLUTIONS FROM SUPERWET ACID

Robert S. Meline, 310 McKinley Ave., Florence, Ala. 35630

Filed Mar. 22, 1971, Ser. No. 126,680
**Int. Cl. C05b *7/00***
U.S. Cl. 71—34
2 Sheets Drawing. 24 Pages Specification

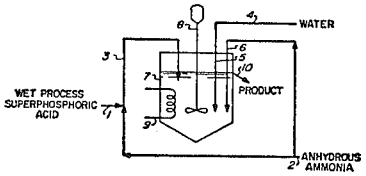

Superwet-process phosphoric acid having from about 5 to about 50 percent of its phosphorus values in the polyphosphate form (i.e., equivalent to about 68.5 to about 72 percent $P_2O_5$ concentration) is reacted with ammonia under conditions that simultaneously neutralize and further molecularly dehydrate the acid whereby the resulting ammonium polyphosphate product is a true solution having improved self-sequestering properties and whereby at least about 80 percent of the phosphorus values therein is in the polyphosphate form (nonorthophosphate). The reaction takes place in a common pipe line through which the phosphoric acid and all or part of the ammonia required for a given grade of liquid fertilizer are fed to the liquid fertilizer vessel. The anhydrous melt formed by the reaction is quenched in the liquid fertilizer which is maintained at a temperature in the range of 130–180° F. by a cooling system. In this vessel the additional ammonia, if required, and the water required are added. Any of the conventional cooling systems may be used. The heat of reaction between the phosphoric acid and ammonia provides the energy for the molecular dehydration of the acid. In established processes for producing liquid fertilizer, this heat of reaction is dissipated as rapidly as it is produced and consequently no use of this energy is made and the polyphosphate content of the liquid fertilizer is no greater than was in the acid used.

The subject matter of this disclosure is claimed in a continuation-in-part application.

AMMONIUM POLYPHOSPHATE SOLUTIONS FROM SUPERWET ACID

Filed March 22, 1971 2 Sheets-Sheet 1

Robert S. Meline INVENTOR.

BY Robert A. Petracek

AMMONIUM POLYPHOSPHATE SOLUTIONS FROM SUPERWET ACID

Filed March 22, 1971 2 Sheets-Sheet 2

SOLUBILITY OF MgO IN 10-34-0 AMMONIUM POLYPHOSPHATE SOLUTIONS AT 25°C

Robert S. Meline INVENTOR.

BY Robert A. Pikunas